(12) United States Patent
Khan et al.

(10) Patent No.: US 10,249,297 B2
(45) Date of Patent: Apr. 2, 2019

(54) PROPAGATING CONVERSATIONAL ALTERNATIVES USING DELAYED HYPOTHESIS BINDING

(71) Applicant: Microsoft Technology Licensing, LLC, Redmond, WA (US)

(72) Inventors: Omar Zia Khan, Bellevue, WA (US); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 14/797,492

(22) Filed: Jul. 13, 2015

(65) Prior Publication Data

US 2017/0018271 A1  Jan. 19, 2017

(51) Int. Cl.
*G10L 15/00* (2013.01)
*G10L 15/183* (2013.01)
(Continued)

(52) U.S. Cl.
CPC ............ *G10L 15/183* (2013.01); *G10L 15/08* (2013.01); *G10L 15/14* (2013.01); *G10L 15/18* (2013.01);
(Continued)

(58) Field of Classification Search
CPC ................ G06F 17/2785; G06F 17/28; G06F 17/30654; G06F 3/167; G10L 15/1815;
(Continued)

(56) References Cited

U.S. PATENT DOCUMENTS

| 6,182,028 B1 * | 1/2001 | Karaali ................ G10L 15/18 704/10 |
| 6,581,033 B1 * | 6/2003 | Reynar ................ G10L 15/22 704/231 |

(Continued)

FOREIGN PATENT DOCUMENTS

| EP | 1199630 | 4/2002 |
| JP | 2003255986 | 9/2003 |

(Continued)

OTHER PUBLICATIONS

PCT International Search Report in PCT/US2016/041827, dated Sep. 30, 2016, 13 pages.

(Continued)

*Primary Examiner* — Abdelali Serrou

(57) ABSTRACT

Examples of the present disclosure describe processing by an input understanding system/service. A received input is processed to generate a set of alternatives for recognizing the received input. The set of alternatives is filtered. Filtering comprises ranking the set of alternatives and propagating a plurality of the ranked alternatives for additional processing. The propagated alternatives are processed to generate an expanded set of alternatives for potential hypotheses based on the received input. The expanded set of alternatives is filtered. Filtering comprises ranking alternatives of the expanded set and propagating a plurality of the ranked alternatives of the expanded set for additional processing. The propagated alternatives of the expanded set are evaluated based on application of knowledge data fetched from external resources. A response to the received input is generated. Generating of the response comprises ranking the evaluated alternatives and selecting the response based on the ranked and evaluated alternatives.

22 Claims, 8 Drawing Sheets

(51) Int. Cl.
*G10L 15/18* (2013.01)
*G10L 15/22* (2006.01)
*G10L 15/24* (2013.01)
*G10L 15/14* (2006.01)
*G10L 15/32* (2013.01)
*G10L 15/08* (2006.01)

(52) U.S. Cl.
CPC .......... *G10L 15/1822* (2013.01); *G10L 15/22* (2013.01); *G10L 15/24* (2013.01); *G10L 15/32* (2013.01); *G10L 2015/228* (2013.01)

(58) Field of Classification Search
CPC ....... G10L 15/183; G10L 15/19; G10L 15/20; G10L 15/265; G10L 17/22; G10L 15/22; G10L 15/30; G10L 2015/088; G10L 2015/221; G10L 15/1822; G10L 15/26; G10L 2015/223; G10L 15/00; G10L 15/085; G10L 15/08; G10L 15/18; G10L 15/24; G10L 15/1892; G10L 15/14; G10L 15/32

See application file for complete search history.

(56) References Cited

U.S. PATENT DOCUMENTS

| | | | |
|---|---|---|---|
| 6,922,669 | B2 | 7/2005 | Schalk et al. |
| 6,931,384 | B1 | 8/2005 | Horvitz et al. |
| 7,149,970 | B1* | 12/2006 | Pratley .................. G06F 17/273 715/257 |
| 7,216,080 | B2 | 5/2007 | Tsiao et al. |
| 7,493,257 | B2 | 2/2009 | Kim et al. |
| 7,577,709 | B1 | 8/2009 | Kolcz |
| 7,606,714 | B2 | 10/2009 | Williams et al. |
| 7,684,990 | B2 | 3/2010 | Caskey et al. |
| 7,716,056 | B2 | 5/2010 | Weng et al. |
| 7,729,904 | B2 | 6/2010 | Bennett |
| 7,869,998 | B1 | 1/2011 | Di Fabbrizio et al. |
| 7,925,507 | B2 | 4/2011 | Weng et al. |
| 7,974,842 | B2 | 7/2011 | Helbing et al. |
| 8,249,876 | B1 | 8/2012 | Ainslie |
| 8,346,563 | B1 | 1/2013 | Hjelm et al. |
| 8,355,920 | B2 | 1/2013 | Gopinath et al. |
| 8,566,076 | B2 | 10/2013 | Deng et al. |
| 8,677,377 | B2 | 3/2014 | Cheyer et al. |
| 8,799,000 | B2 | 8/2014 | Guzzoni et al. |
| 8,909,528 | B2 | 12/2014 | Eide et al. |
| 8,954,420 | B1* | 2/2015 | Khan ................ G06F 17/30867 707/722 |
| 8,983,840 | B2 | 3/2015 | Deshmukh et al. |
| 8,996,381 | B2 | 3/2015 | Mozer et al. |
| 9,009,046 | B1 | 4/2015 | Stewart |
| 9,043,197 | B1* | 5/2015 | Pasca ................ G06F 17/30654 704/10 |
| 9,152,376 | B2 | 10/2015 | Johnston et al. |
| 9,311,298 | B2* | 4/2016 | Sarikaya ................ G10L 15/18 |
| 9,318,108 | B2 | 4/2016 | Gruber et al. |
| 9,548,050 | B2* | 1/2017 | Gruber .................... G06F 17/28 |
| 9,576,578 | B1* | 2/2017 | Skobeltsyn ............ G10L 15/26 |
| 9,690,851 | B2* | 6/2017 | Nauze ................ G06F 17/2785 |
| 9,886,950 | B2* | 2/2018 | Karov .................... G10L 15/197 |
| 10,140,206 | B2 | 11/2018 | Sapozhnikov et al. |
| 2002/0077806 | A1 | 6/2002 | Tarbouriech et al. |
| 2003/0187644 | A1* | 10/2003 | Mohri ...................... G10L 15/00 704/240 |
| 2003/0233230 | A1 | 12/2003 | Ammicht et al. |
| 2005/0149498 | A1* | 7/2005 | Lawrence .......... G06F 17/30864 |
| 2007/0038436 | A1 | 2/2007 | Cristo et al. |
| 2008/0177541 | A1 | 7/2008 | Satomura |
| 2010/0100380 | A1 | 4/2010 | Tur |
| 2012/0089387 | A1* | 4/2012 | Gamon .................. G06F 17/274 704/9 |
| 2012/0089392 | A1 | 4/2012 | Larco et al. |
| 2012/0102050 | A1 | 4/2012 | Button et al. |
| 2012/0173464 | A1 | 7/2012 | Tur et al. |
| 2012/0265528 | A1 | 10/2012 | Gruber et al. |
| 2012/0296638 | A1 | 11/2012 | Patwa |
| 2013/0332158 | A1 | 12/2013 | Corfield et al. |
| 2014/0019116 | A1 | 1/2014 | Lundberg et al. |
| 2014/0040274 | A1 | 2/2014 | Aravamudan et al. |
| 2014/0040748 | A1 | 2/2014 | Lemay et al. |
| 2014/0181096 | A1 | 6/2014 | Zhuang et al. |
| 2014/0250378 | A1 | 9/2014 | Stifelman et al. |
| 2014/0280092 | A1 | 9/2014 | Marantz et al. |
| 2014/0379326 | A1 | 12/2014 | Sarikaya et al. |
| 2015/0012271 | A1* | 1/2015 | Peng ....................... G10L 15/08 704/235 |
| 2015/0142420 | A1 | 5/2015 | Sarikaya et al. |
| 2015/0340033 | A1 | 11/2015 | Di Fabbrizio et al. |
| 2016/0196499 | A1 | 7/2016 | Khan et al. |
| 2016/0378080 | A1 | 12/2016 | Uppala et al. |
| 2017/0139816 | A1 | 5/2017 | Sapozhnikov et al. |
| 2017/0330560 | A1 | 11/2017 | Wang et al. |
| 2018/0321052 | A1 | 11/2018 | Gilbert |

FOREIGN PATENT DOCUMENTS

| | | |
|---|---|---|
| WO | 200075864 | 12/2000 |
| WO | 2006084228 | 8/2006 |
| WO | 2008049834 | 5/2008 |
| WO | 2011028842 | 3/2011 |
| WO | 20110088053 | 7/2011 |
| WO | 2012135783 A1 | 10/2012 |

OTHER PUBLICATIONS

Jean-Philippe Robichaud et al., "Hypotheses Ranking for Robust Domain Classification and Tracking in Dialogue Systems" Proc. Interspeech, Sep. 14, 2014, retrieved from Internet: http://mazsola.iit.uni-miskolc.hu/~czap/letoltes/IS14/IS2014/pdf/author/is141384.pdf, pages.

Omar Zia Khan et al., "Hypotheses Ranking and State Tracking for a Multi-Domain Dialog System using Multiple ASR Alternates", Sep. 1, 2015, 5 pages. retrieved from Internet: https://www.microsoft.com/en-us/research/wp-content/uploads/2015/09/1593anav.pdf.

He, et al., "Speech-Centric Information Processing: An Optimization-Oriented Approach", In Proceedings of IEEE, vol. 101, Issue 5, May 2013, 20 pages.

"Second Written Opinion Issued in PCT Application No. PCT/US2016/041827", dated Jun. 13, 2017, 6 Pages.

Ammicht, et al., "Ambiguity Representation and Resolution in Spoken Dialogue Systems", In Proceedings of European Speech Processing Conference, Sep. 2001, 4 pages.

Brezillon, Patrick, "Context-Based Intelligent Assistant Systems: A discussion based on the Analysis of Two Projects", In Proceedings of the 36th Annual Hawaii International Conference on System Sciences, Jan. 6, 2003, 9 pages.

Chen et al., "Machine Learning", Published on: Mar. 4, 2010, Available at: http://research.microsoft.com/en-us/groups/ml/, 3 pgs.

Crockett, et al., "A Fuzzy Model for Predicting Learning Styles using Behavioral Cues in an Conversational Intelligent Tutoring System", In IEEE International Conference on in Fuzzy Systems, Jul. 2013, 8 pages.

Kang, et al., "Hierarchical Speech-Act Classification for Discourse Analysis", In Journal of Pattern Recognition Letters, vol. 34, Issue 10, Jul. 2013, 21 pages.

PCT 2nd Written Opinion in International Application PCT/US2016/012247, dated Nov. 23, 2016, 8 pgs.

PCT International Application PCT/US2016/012247, International Preliminary Report on Patentability dated Feb. 22, 2017, 9 pages.

PCT International Search Report and Written Opinion Issued in PCT Application No. PCT/US2017/048106, dated Nov. 24, 2017, 12 Pages.

PCT International Search Report in International Application PCT/US2016/012247, dated Apr. 14, 2016, 13 pages.

Sun, Ming, "Adapting Spoken Dialog Systems towards Domains and Users", In Thesis of Language Technologies Institute, School of Computer Science, Carnegie Mellon University, Retrieved on: Jul. 13, 2016, 82 pages.

(56) References Cited

OTHER PUBLICATIONS

U.S. Appl. No. 14/591,603, Amendment and Response filed Jan. 8, 2018, 28 pages.
U.S. Appl. No. 14/591,603, Office Action dated Jul. 6, 2017, 32 pages.
U.S. Appl. No. 15/297,790, Office Acton dated Jan. 9, 2018, 19 pages.
"International Preliminary Report on Patentability Issued in PCT Patent Application No. PCT/US2016/041827", dated Sep. 29, 2017, 9 Pages.
U.S. Appl. No. 15/297,790, Office Acton dated Aug. 3, 2018, 21 pages.
"Final Office Action Issued in U.S. Appl. No. 14/591,603", dated Jun. 8, 2018, 31 Pages.
U.S. Appl. No. 15/297,790, Amendment and Response filed Apr. 10, 2018, 11 pages.
"Office Action Issued in European Patent Application No. 16701888.6", dated May 22, 2018, 6 Pages.
"Non Final Office Action Issued in U.S. Appl. No. 15/297,790", dated Dec. 7, 2018, 22 Pages.

* cited by examiner

400

500

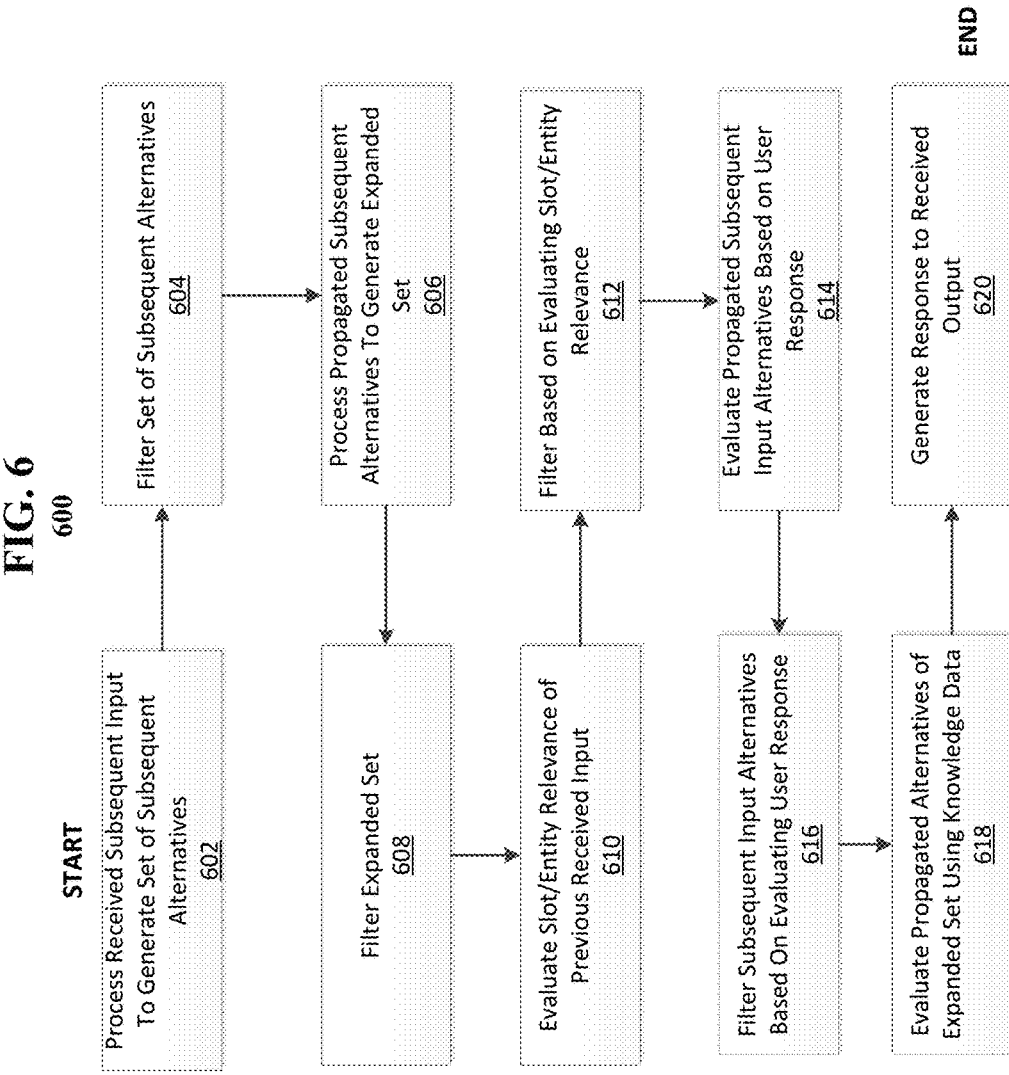

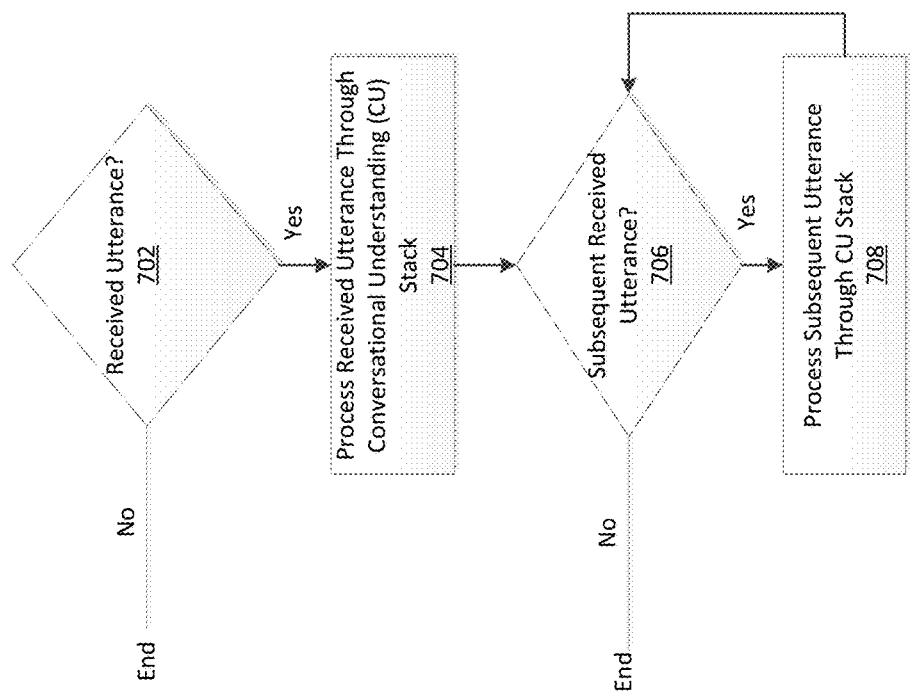

PROPAGATING CONVERSATIONAL ALTERNATIVES USING DELAYED HYPOTHESIS BINDING

BACKGROUND

Conversational understanding systems interpret the intent of users and execute actions based on that interpretation. There are various modules involved in conversational understanding processing including speech recognition, domain detection, intent determination, entity extraction, belief state update and policy execution. At every step, there is a possibility that a system can make an unrecoverable mistake and the effect of that mistake gets cascaded throughout the rest of the system. It is with respect to this general technical environment that the present application is directed.

SUMMARY

Non-limiting examples of the present disclosure describe exemplary processing by an input understanding system/service. A received input is processed to generate a set of alternatives for recognizing the received input. The set of alternatives is filtered, wherein the filtering comprises ranking the set of alternatives and propagating a plurality of the ranked alternatives for additional processing. The propagated alternatives are processed to generate an expanded set of alternatives for potential hypotheses from the received input. The expanded set of alternatives is filtered, wherein the filtering comprises ranking alternatives of the expanded set and propagating a plurality of the ranked alternatives of the expanded set for additional processing. The propagated alternatives of the expanded set are evaluated based on application of knowledge data fetched from external resources. A response to the received input is then generated, wherein generating of the response comprises ranking the evaluated alternatives and selecting the response based on the ranked and evaluated alternatives.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 6 is an exemplary method for input understanding processing with which aspects of the present disclosure may be practiced.

FIG. 7 is an exemplary method for conversational understanding processing with which aspects of the present disclosure may be practiced.

DETAILED DESCRIPTION

Figure 1:
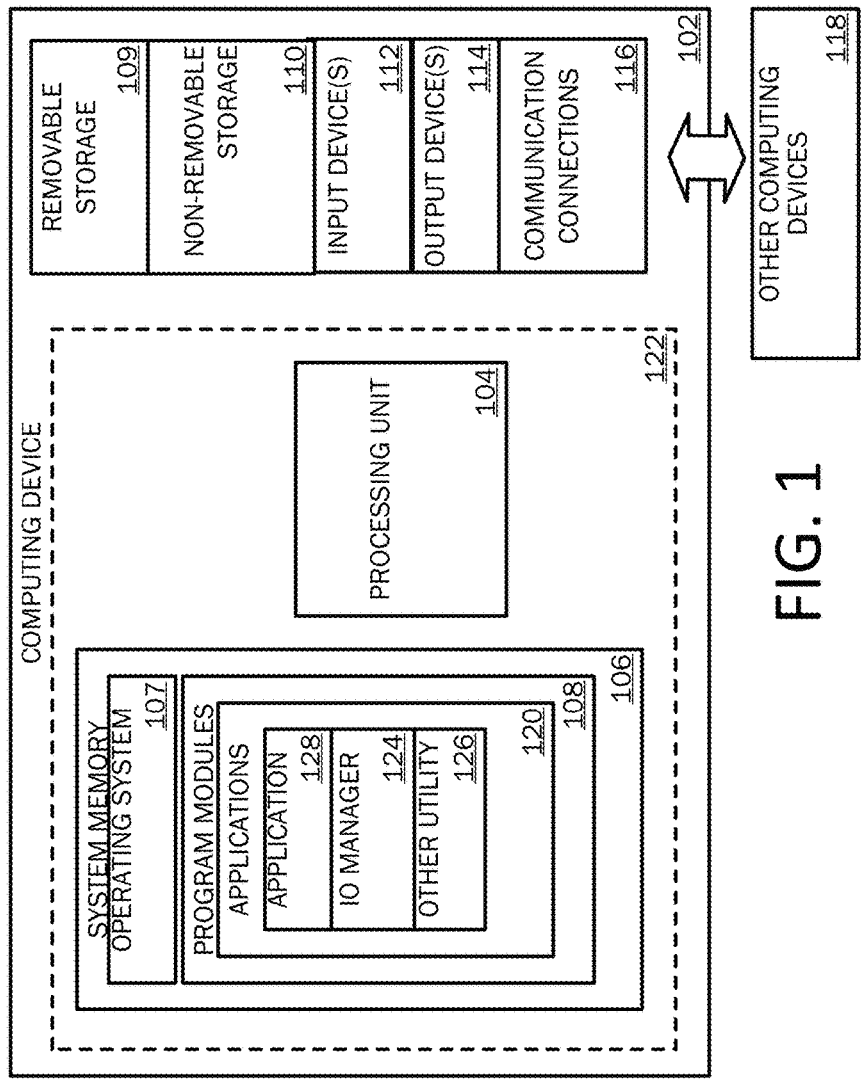
FIG. 1 is a block diagram illustrating an example of a computing device with which aspects of the present disclosure may be practiced.

Input understanding systems receive input from users and perform different tasks based on that input. To function correctly and with a high level of user satisfaction, it is imperative that the system makes the minimum number of errors possible. Errors in input understanding systems can occur at any stage such as input recognition (e.g., automatic speech recognition (ASR)), language understanding (LU), or belief state processing. The present disclosure describes examples that make input understanding systems/services more robust to minimize errors from any input understanding component by considering multiple alternatives throughout processing. In examples, components of an input understanding system/service can be configured such that a component may generate a ranked list of alternatives instead of a single output. In this fashion, multiple alternatives can be propagated throughout an input understanding system/service and the decision about a top choice(s) for output can be delayed until a final processing operation is applied. Among other benefits, this enables an input understanding system/service to apply additional context and factor in any knowledge-fetch results in the final decision-making operation to determine the best possible result(s) for output. Additionally, examples describe herein produce improved input understanding system/services by avoiding binding processing output by a component to a single hypothesis/result. This improves processing by minimizing possibility of an input understanding system/service having an unrecoverable error during interaction with users, among other examples.

Furthermore, examples describe herein avoid combinatorial explosion that exists due to an exponential increase in generated alternatives at each stage of input processing. For instance, a first component of an input understanding system may generative a plurality of alternative results/hypotheses. As processing proceeds to additional components of an input understanding system, that number of alternative hypotheses/results may grow exponentially. Accordingly, combinatorial explosion can cause capacity as well as latency issues. Examples of the present disclosure may utilize configurable intermediate rankers to avoid combinatorial explosion of alternative hypotheses/results. In examples, configurable intermediate rankers may prune a list of alternatives generated by a component of input understanding component, for example, before passing a list of alternatives to a next processing component. Examples may enable rankers to be configurable to limit (e.g., top choice or N best) alternatives output by a component at any given stage of input understanding processing. In examples, capacity and latency constraints may be considered in determining an output allowed by a configurable intermediate ranker of exemplary input understanding systems/services.

Moreover, examples described herein may retain generated alternative hypothesis/result data (e.g., both data selected for output as well as unselected data). Hypothesis/result data generated may be retained in the form of an enriched belied state that can be consulted in a subsequent exchange between a user and an input understanding system/service. For instance, if an input understanding system/service chooses an incorrect hypothesis/result, the input understanding system/service can utilize the processing previously performed to efficiently output an alternative hypothesis/result.

Accordingly, the present disclosure provides a plurality of technical effects including but not limited to: enhanced input understanding processing, improved accuracy in identifying and output of response options, reduction in error rate for processing of a received input, improved efficiency and usability for input understanding systems/services, reduction of processing load for input understanding systems/services, and control over user interaction for input understanding processing, among other examples.

Figure 2A:
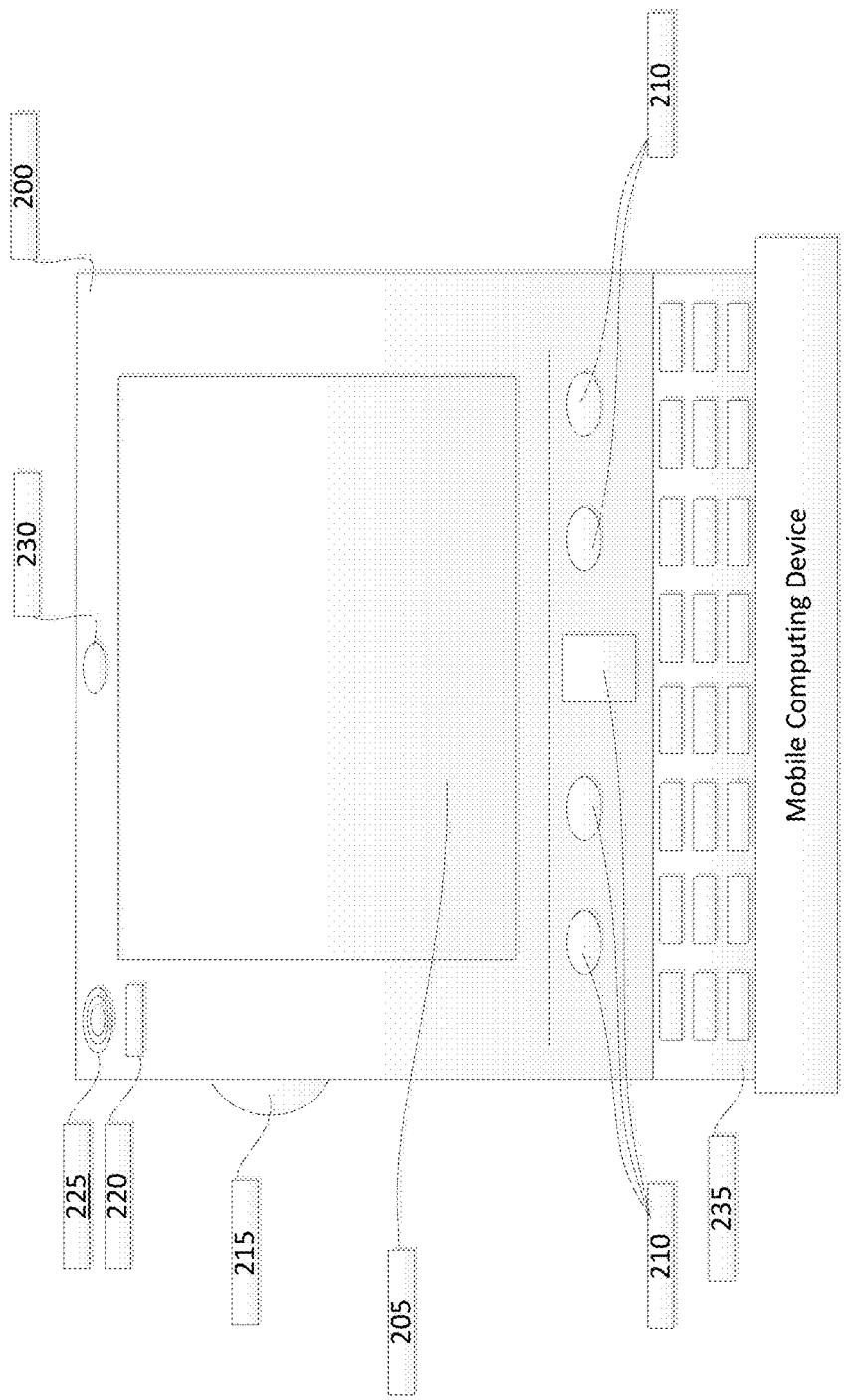
FIGS. 2A and 2B are simplified block diagrams of a mobile computing device with which aspects of the present disclosure may be practiced.
Figure 2B:
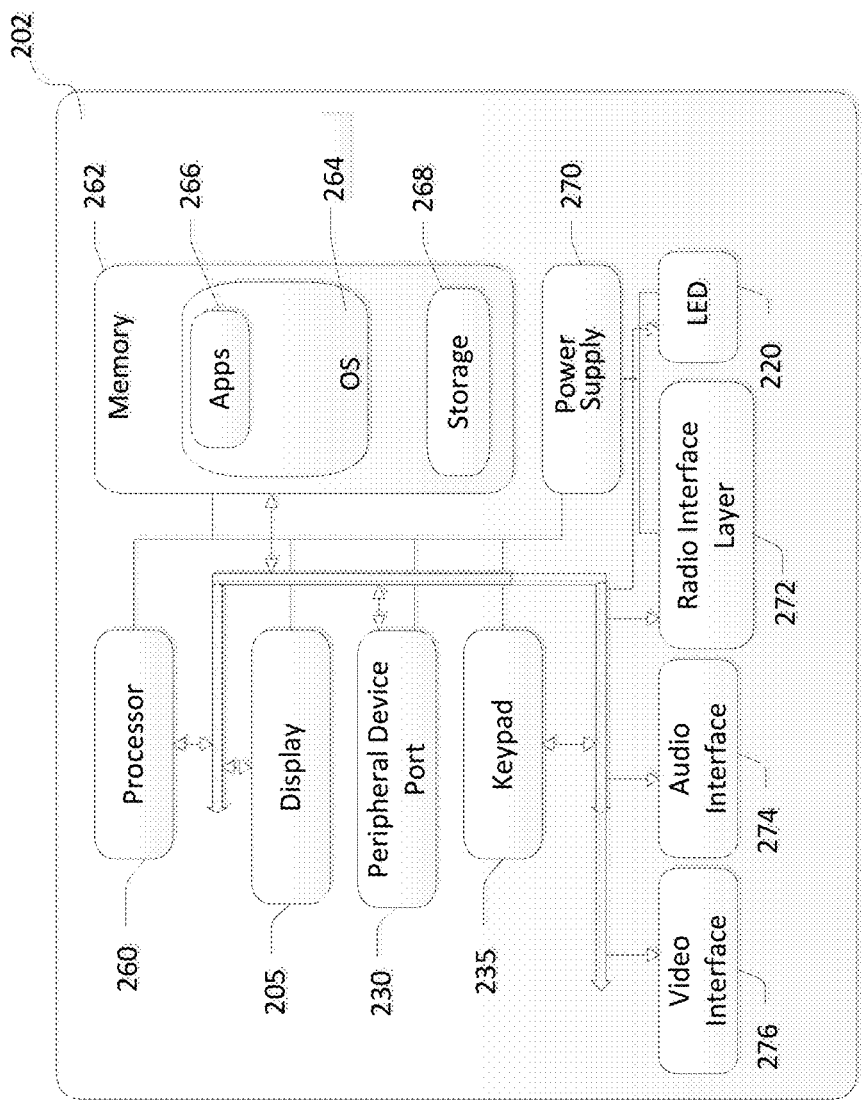
Figure 3:
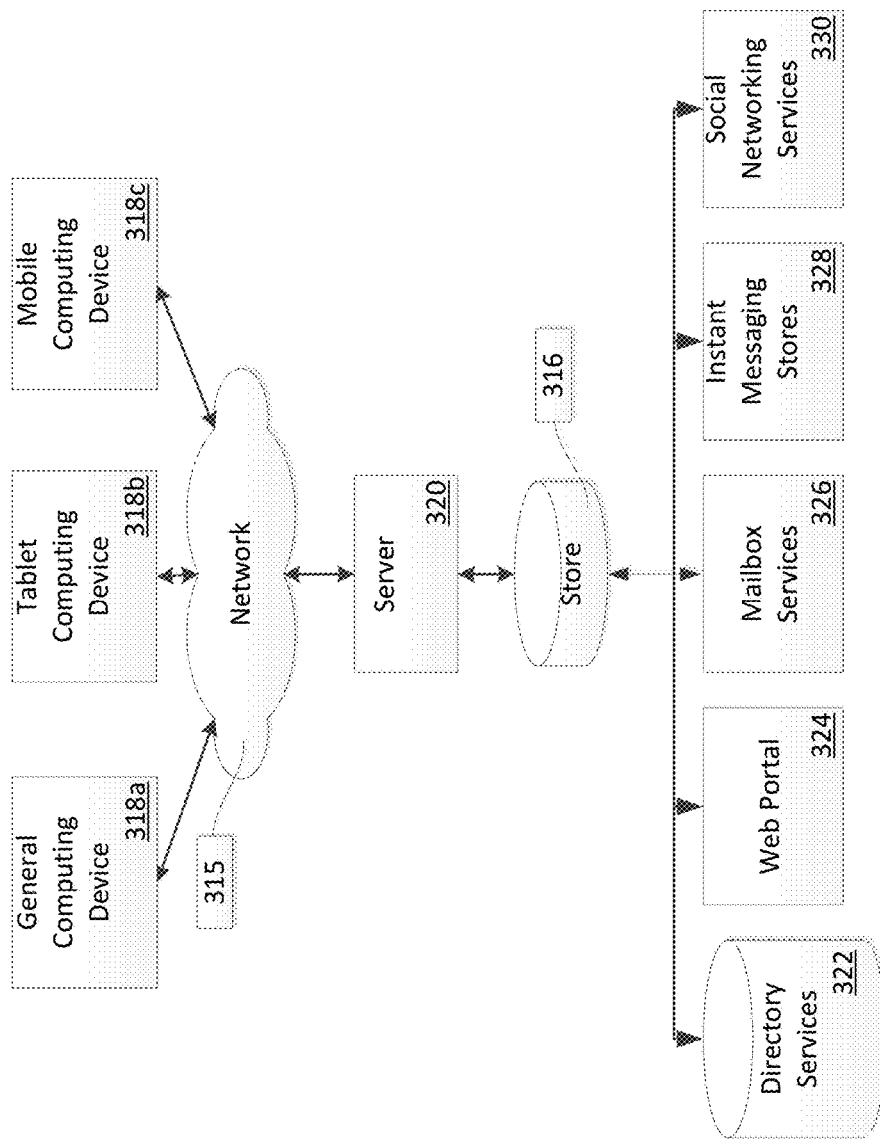
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. For example, mobile computing device 200 may be implemented to execute applications and/or application command control. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape.

Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
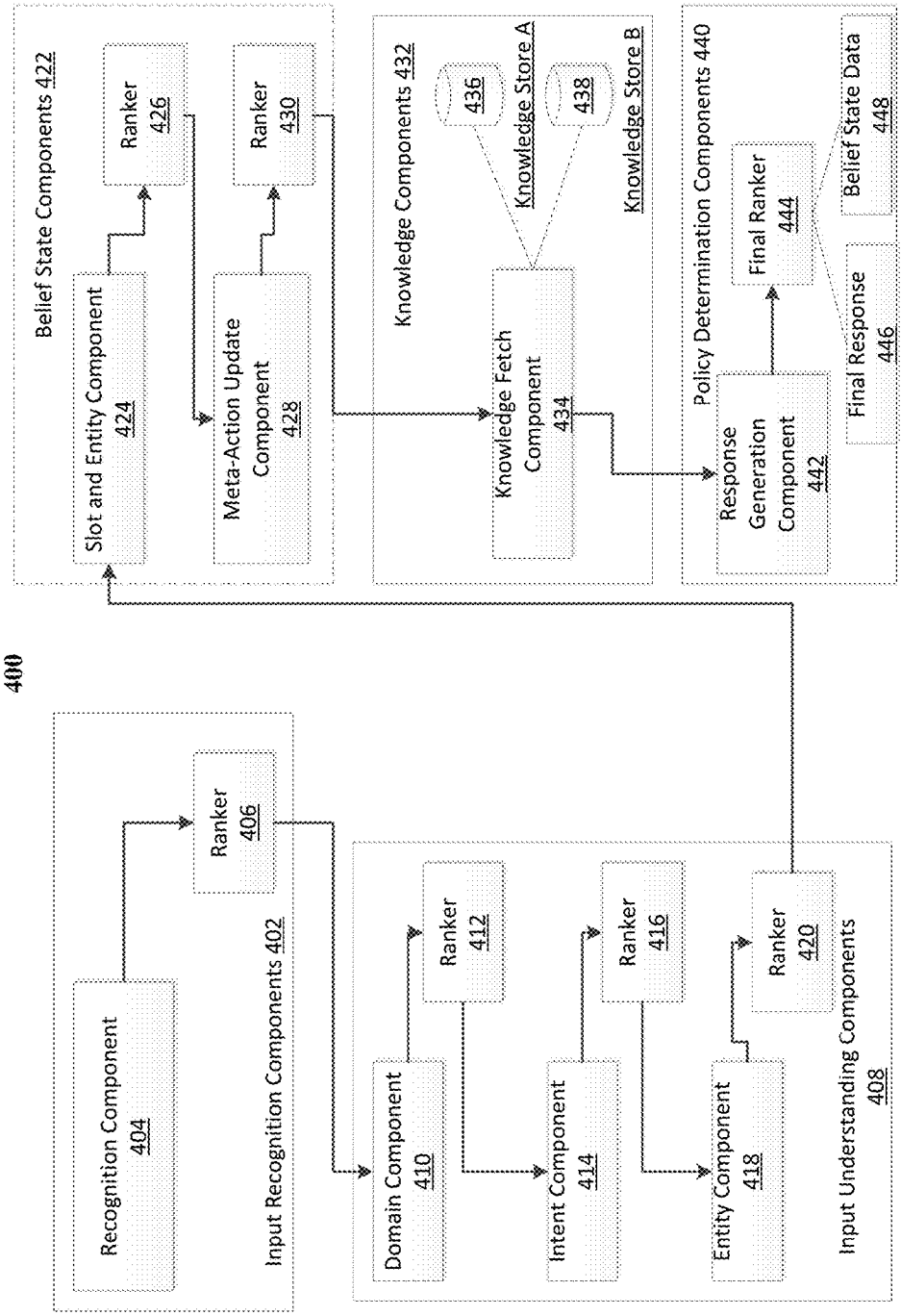
FIG. 4 illustrates an exemplary system implementable on one or more computing devices on which aspects of the present disclosure may be practiced.

FIG. 4 illustrates an exemplary system 400 implementable on one or more computing devices, according to examples described herein. Exemplary system 400 presented is a combination of interdependent components that interact to form an integrated whole for learned program generation based on user example operations. Components of system 400 may be hardware components or software implemented on and/or executed by hardware components of system 400. In examples, system 400 may include any of hardware components (e.g., ASIC, other devices used to execute/run operating system (OS)), and software components (e.g., applications, application programming interfaces, modules, virtual machines, runtime libraries, etc.) running on hardware. In one example, an exemplary system 400 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Components of the system 400 may interface with an OS of a processing device to allow input understanding and processing. For example, the system 400 may be configured to receive input from a user and process the received input to manage user interaction. Aspects related to enabling entry of input and receiving the input for processing are well known in the field of use and are not described in the present disclosure. In one example, system 400 may be an input understanding system such as a conversational understanding (CU) system. However, the system 400 possesses processing means and may be configured to handle any type of input including but not limited to speech/voice input, text input, gesture input, handwritten input, among other examples. In one example, the system 400 may operate as an intelligent personal assistant. An intelligent personal assistant is a mobile software agent that can perform tasks, or services, for an individual based on user input, location awareness, and the ability to access information from a variety of online sources. Examples of intelligent personal assistants that the system 400 may operate with include but are not limited to SILVIA, S-Voice, Voice Mate, Google Now, Cortana, Hidi and Siri, among other examples. However, one skilled in the art will recognize that input understanding processing examples are not limited to application in an intelligent personal assistant. Exemplary system 400 comprises input recognition components 402, input understanding components 408, belief state components 422, knowledge components 432, and policy determination components 440, where each of the identified components may comprise one or more additional components as shown in FIG. 4.

Furthermore, in examples, components of system 400 may utilize knowledge data in processing by components of system 400. Knowledge data is any data that is usable by a component of system 400 to improve processing of received inputs, generation of alternatives, ranking of alternatives, and propagation of ranked alternatives. In examples, knowledge data may be maintained by data stores of the knowledge components 432. However, in other examples, each component of system 400 may maintain individual resources for knowledge data (e.g., data stores and/or connection to resources that are internal and/or external to system 400) that can be used to improve individual processing of a component of system 400.

Input recognition components 402 are components of the system 400 that receive, process and translate a received input for recognition. When an input is received by system 400, the input is transmitted to the input recognition components 402 for processing. The input recognition components 402 may interface with a user interface of system 400 to initiate processing of a received input. As examples described above, inputs processed by the input recognition components 402 include but are not limited to speech/voice input (e.g., utterances), text input, gesture input and handwritten input, among other examples. In system 400, input recognition components may comprise a recognition component 404 and at least one ranker 406.

Recognition component 404 is configured to process the received input into a form that is able to be understood by components of system 400. As an example, the recognition component 404 may be able to process spoken queries into text. In example, recognition component 404 may implement automatic speech recognition (ASR), computer speech recognition, or speech to text (STT), among other examples, to process speech to text for evaluation/additional processing by system 400. The recognition component 404 is configurable to generate a set of potential alternatives for recognizing the received input. An alternative is a result generated by a processing component of system 400 that is produced based on processing by one or more components of system 400. In examples, a recognition component 404 may produce alternatives related to how the input is understood by system 400. For instance, a speech input or utterance may be received and evaluated to generate alternatives such as "I'm Home" and "Drive Home." That is, in processing the received utterance, the recognition component 404 may generate a set of alternatives related to what the system 400 understood from the received utterance. The recognition component 404 may process the received input and generate an NBest list of alternatives for the received input. In another example, the recognition component 404 may process the received input by producing a word confusion network (WCN) and/or lattice which can then be used to generate top and subsequent alternatives for the received input. Like other components of system 400, the recognition component 404 may retain as well as propagate alternative interpretations instead of settling on a single choice for output. Alternatives generated by the recognition component 404 may be propagated to ranker 406.

In any case, the recognition component 404 interfaces with one or more ranker 406 components that can be used to evaluate the alternatives generated by the recognition component 404. In examples, the ranker 406 can be used to rank a plurality of alternatives generated by the recognition component 404. In one example, generated alternatives may be ranked based on a determined likelihood that an alternative satisfies an intention of a received input. However, a component may analyze and evaluate alternative in any manner that enables the component to distinguish alternatives from one another. In examples, a confidence value may be associated with each of the generated alternatives. For instance, in the example above where a received utterance is interpreted as "I'm Home" and another as "Drive Home", a confidence value may be assessed to each of the potential alternatives, where the confidence value indicates how confident the recognition component 404 is with respect to interpreting the received utterance. Comparison of alternatives may include statistical modeling and/or ranking of alternatives whereby metrics may be applied to rank the generated alternatives. In one example, machine learning processing is applied to rank alternatives or alternates generated by the input recognition component 404 or any other component of system 400.

As can be imagined, a large amount of alternatives for understanding of a received input may be generated. As system 400 continues to process more and more alternatives, combinatorial explosion may occur due to the large number of potential alternatives that may be generated be a component of system 400. To address this concern, ranker components of system 400 may be used to prune a listing of outgoing alternatives that are propagated for subsequent processing. For instance, the ranker 406 may interface with the input understand components 408 of system 400 to intelligently propagate a number of ranked alternatives to the input understanding components 408. In doing so, system 400 can make sure components of system 400 are processing effectively and efficiently. As an example, the number of ranked alternatives propagated from the ranker 406 to the input understanding components 408 may be determined using a threshold evaluation. The threshold used to determine the number of ranked alternatives to propagate for subsequent processing can be determined based on latency and/or capacity constraints of the input understanding components 408 and/or processing of other ranking signals. As an example, ranking may include processing a set of ranking signals. Ranking signals comprise signal data that can be used to rank and evaluate generated alternatives/alternates/hypotheses. Ranking signals comprise a large set of signal data including but not limited to: speech recognition confidences, features derived from their distributions, language understanding domain/intent/slot model confidences and their distributions, the same set of signals from the previous turns, and turn identification (ID), among other examples. In one example, ranker 406 may output a single alternative (e.g., a top choice alternative) that is determined based on ranking applied by the ranker 406.

Once an input is recognized by input recognition component processing, the alternatives or set of alternatives propagated are received at the input understanding components 408 of system 400. Input understanding components 408 analyzes context associated with a propagated alternative to further evaluate the propagated alternative and potentially generate additional alternatives, based on application of input understanding processing. As an example, input understanding components 408 may be natural language understanding (NLU) components or a spoken language understanding (SLU) components. However, one skilled in the art will recognize that operations of the input understanding components 408 are not limited to NLUs and SLUs. The input understanding components 408 comprise a domain component 410, a ranker 412, an intent component 414, a ranker 414, an entity component 418 and a ranker 420. In examples, input understanding may comprise domain detection, intent determination and entity extraction. In examples, the input understanding components 408 may produce a triplet containing a domain, an intent, and tagged slots (e.g., extracted entities), and can utilize information from the triplet to determine alternatives/hypotheses related to understanding a received input. In exemplary input understanding processing, each of the domain, intent and entity of an alternative can be evaluated individually. However, in alternative examples, input understanding processing can be streamlined to generate one or more sets of alternatives from the combination of data included in the triplet.

Domain component 410 is a component that detects a domain associated with a propagated alternative. A domain refers to a logical grouping for intent of a received input. For instance, alternatives propagated from the input recognition components 402 may be associated with one or more applications/services that can be used to satisfy intent of a received input. Alternatives may be generated by the domain component 410 based on evaluating the alternatives propagated from the input recognition component 402 (e.g., via ranker 406). As an example, an alternative may be generated for a received input such as "Schedule a meeting with Omar for 3 pm," where a domain (or domains) that may be associated with such an input alternative may be a calendar application and/or an e-mail application, among other examples. In that example, the system 400 may ultimately determine from one alternative that may be pursued is to launch a calendar application and block out time on the user's calendar at 3 pm for a meeting with Omar. Another example alternative may be to associate an alternative with a domain such as the email application, where the final determined result may be to generate an email invitation for a meeting to a user named 'Omar" using an email application. As such, an expanded set of alternatives (that builds off the propagated alternatives received from the input recognition components 402) may be generated by the domain component 410. The expanded set of alternatives are propagated to ranker 412 that is used to further evaluate and rank the expanded set of alternatives. Like other components of system 400, the domain component 410 may retain as well as propagate alternative interpretations instead of settling on a single choice for output. Alternatives generated and/or expanded on by the domain component 410 may be propagated to ranker 412.

One or more ranker 412 components that can be used to evaluate the alternatives propagated from the domain component 410. In one example, generated alternatives may be ranked based on a determined likelihood that an identified domain in an alternative/alternate satisfies an intention of a received input. However, a component may analyze and evaluate alternatives/alternates in any manner that enables the component to distinguish alternatives from one another. In examples, a confidence value may be associated with each of the generated alternatives. A confidence value may be assessed to each of the potential alternatives, where the confidence value indicates how confident the domain component 410 is with respect to developing hypotheses/alternatives for a received input. Comparison of alternatives may include statistical modeling and/or ranking of alternatives whereby metrics may be applied to rank the generated alternatives. Ranker 412 may be used to prune a listing of outgoing alternatives that are propagated for subsequent processing. For instance, the ranker 412 may interface with the intent component 414 of system 400 to intelligently propagate a number of ranked alternatives through the input understanding components 408. In doing so, system 400 can make sure components of system 400 are processing effectively and efficiently. As an example, the number of ranked alternatives propagated from the ranker 412 to the intent component 414 may be determined using a threshold evaluation. The threshold used to determine the number of ranked alternatives to propagate for subsequent processing can be determined based on latency and/or capacity constraints of the intent component 414 and/or processing of other ranking signals (as described above). However, in another example, ranker 412 may output a single alternative (e.g., a top choice alternative) determined based on ranking applied.

Ranked alternatives may be propagated from ranker 412 to intent component 414 of the input understanding components 408. The intent component 414 determines intent associated with a propagated alternative. For instance, in evaluating the received input of "Schedule a meeting with Omar for 3 pm," a propagated alternative received from ranker 412 may identify that a domain associated with the received input is the email application. The intent component 414 further evaluates an alternative/alternate to figure out the action associated with the identified domain. In this example, the intent may be to generate an email meeting invite to a contact named "Omar". The intent component 414 may generate a plurality of alternatives to further build the expanded set. The alternatives generated by the intent component 414 may be propagated to ranker 416. Like other components of system 400, the intent component 414 may retain as well as propagate alternative interpretations instead of settling on a single choice for output. Alternatives generated and/or expanded on by the intent component 414 may be propagated to ranker 416.

One or more ranker 416 components that can be used to evaluate the alternatives propagated from the intent component 414. In one example, generated alternatives may be ranked based on a determined likelihood that the alternative/alternate satisfies an intention of a received input. However, a component may analyze and evaluate alternatives in any manner that enables the component to distinguish response options/alternatives from one another. In examples, a confidence value may be associated with each of the generated alternatives. A confidence value may be assessed to each of the potential alternatives, where the confidence value indicates how confident the intent component 414 is with respect to developing hypotheses/alternatives for a received input. Comparison of alternatives may include statistical modeling and/or ranking of alternatives whereby metrics may be applied to rank the generated alternatives. Ranker 416 may be used to prune a listing of outgoing alternatives that are propagated for subsequent processing. For instance, the ranker 416 may interface with the entity component 418 of system 400 to intelligently propagate a number of ranked alternatives through the input understanding components 408. In doing so, system 400 can make sure components of system 400 are processing effectively and efficiently. As an example, the number of ranked alternatives propagated from the ranker 416 to the entity component 418 may be determined using a threshold evaluation. The threshold used to determine the number of ranked alternatives to propagate for subsequent processing can be determined based on latency and/or capacity constraints of the entity component 418 and/or processing of other ranking signals (as described above). However, in another example, ranker 416 may output a single alternative (e.g., a top choice alternative) determined based on ranking applied.

Ranked alternatives may be propagated from ranker 416 to entity component 418 of the input understanding components 408. The entity component 418 determines one or more potential entities that can be extracted from a propagated alternative. An entity is a classified element of data used for identification. For instance, an entity is a term or phrase that identifies an element from a set of other elements based on properties/attributes. As an example, in evaluating the received input of "Schedule a meeting with Omar for 3 pm," a propagated alternative received from ranker 416 may identify that an entity associated with that alternative is a contact named "Omar." The entity component 418 further evaluates the example alternative to figure out who/what Omar is referring to. In this example, a contact named "Omar" may be stored in a contact listing in an application/service or data store associated with system 400. The entity component 418 may generate a plurality of alternatives to further build the expanded set. The alternatives generated by the entity component 418 may be propagated to ranker 420. Like other components of system 400, the entity component 418 may retain as well as propagate alternative interpretations instead of settling on a single choice for output. Alternatives generated and/or expanded on by the entity component 418 may be propagated to ranker 420.

One or more ranker 420 components that can be used to evaluate the alternatives propagated from the entity component 418. In one example, generated alternatives may be ranked based on a determined likelihood of the system 400 that an identified entity is what the user of the input intended (e.g., did the user mean Omar in the contact list or another Omar). However, a component may analyze and evaluate response options in any manner that enables the component to distinguish alternatives/alternates from one another. In examples, a confidence value may be associated with each of the generated alternatives. A confidence value may be assessed to each of the potential alternatives, where the confidence value indicates how confident the entity component 418 is with respect to developing hypotheses/alternatives for a received input. Comparison of alternatives may include statistical modeling and/or ranking of alternatives whereby metrics may be applied to rank the generated alternatives. Ranker 420 may be used to prune a listing of outgoing alternatives that are propagated for subsequent processing. For instance, the ranker 420 may interface with one of the belief state components 422 or the knowledge components 432 of system 400 to intelligently propagate a number of ranked alternatives for additional processing. In doing so, system 400 can make sure components of system 400 are processing effectively and efficiently. As an example, the number of ranked alternatives propagated from the ranker 420 may be determined using a threshold evaluation. The threshold used to determine the number of ranked alternatives to propagate for subsequent processing can be determined based on latency and/or capacity constraints of a subsequent component that is to continue processing and/or processing of other ranking signals (as described above). However, in another example, ranker 420 may output a single alternative (e.g., a top choice alternative) determined based on ranking applied.

System 400 further comprises belief state components 422. In an example where a subsequent input is being processed, ranker 420 may propagate alternatives to the belief state components 422 for further processing. Belief state components 422 are used to evaluate a state of interaction (e.g., conversation, dialogue, etc.) with a user and use the belief state data 448 to improve processing by system 400 with respect to satisfaction of intent of a received input. The belief state components 422 comprise a slot and entity component 424, a ranker 426, a meta-action update component 428 and a ranker 430.

Belief state components 422 may be utilized by system 400 when subsequent input is received that builds off of a prior received input. As an example, an interaction between a user and system 400 may carry on for multiple turns, where an input is received, a response is returned, and further input is to be processed. Examples of this can be that a response was not what the user intended, a mistake occurred in understanding, or that the user changed the direction of interaction, among other examples. Any of the processing components of system 400 including the input recognition components 402, input understanding components 408 and policy determination components 440, may interface with the belief state components 422 to improve processing by the individual components. During a prior turn of evaluating a received input, belief state data 448 may be maintained. Belief state data 448 may comprise result data from processing performed by one or more of the components of system 400. For instance, belief state data 448 may be stored with respect to processing by input recognition components 402. Belief state data 448 may also be retained for the entirety of processing performed by components of system 400, for example, where final determined hypotheses (e.g., results or response options) may be retained. For instance, both selected and non-selected hypotheses may be stored for future use if needed during interaction with a user. The belief state components 422 may utilize the belief state data 448 to further evaluate propagated alternatives.

The slot and entity component 424 is a component that determines whether a slot or entity from a previous received input is still relevant to the interaction with the user. As an example, the slot and entity component 424 determines whether to carry over a slot or entity from a previous turn to a current turn for evaluating received input. As an example, a slot (or tagged slot) is segmentation of a received input. As described above, an entity is a classified element of data used for identification. In examples, if the slot and entity component 424 determines that a slot or entity is still relevant to the interaction with a user, the expanded set of alternatives is further evaluated with respect to the relevance of the entity/slot. In examples where the slot and entity component 424 determines that a slot or entity is no longer relevant to the interaction, the slot and entity component 424 may update the expanded set of alternatives by purging alternatives associated a non-relevant slot or entity, among other examples. Further, the slot and entity component 424 can be configured such that it produces multiple ranked outputs for different levels of confidence with respect to potential alternatives for determining an output of system 400. For instance, a user may have provided clarification that a contact of "Omar" means a first person named "Omar" listed in the contacts and not a second person also having the name "Omar." Alternatively, in another example, a user, in a received input, may have decided to setup a meeting with a contact named "Ruhi" instead of "Omar." In any case, the slot and entity component 424 may update alternatives that may be considered for output based on applying the belief state data 448 to evaluate subsequent received input. Like other components of system 400, the slot and entity component 424 may retain as well as propagate alternative interpretations instead of settling on a single choice for output. Alternatives generated and/or expanded on by the slot and entity component 424 may be propagated to ranker 426.

One or more ranker 426 components that can be used to evaluate the alternatives propagated from the slot and entity component 424. In one example, generated alternatives may be ranked based on a determined likelihood of the system 400 that an identified slot or entity is still relevant to the current turn in a user interaction. However, a component may analyze and evaluate alternatives and/or hypotheses in any manner that enables the component to distinguish potential alternatives and/or hypotheses from one another. In examples, a confidence value may be associated with each of the generated alternatives. A confidence value may be assessed to each of the potential alternatives, where the confidence value indicates how confident the slot and entity component 424 is with respect to developing hypotheses/alternatives for a received input. Comparison of alternatives may include statistical modeling and/or ranking of alternatives whereby metrics may be applied to rank the generated alternatives. Ranker 426 may be used to prune a listing of outgoing alternatives that are propagated for subsequent processing. For instance, the ranker 426 may interface with the meta-action update component 428 or the knowledge components 432 of system 400 to intelligently propagate a number of ranked alternatives for additional processing. In doing so, system 400 can make sure components of system 400 are processing effectively and efficiently. As an example, the number of ranked alternatives propagated from the ranker 426 may be determined using a threshold evaluation. The threshold used to determine the number of ranked alternatives to propagate for subsequent processing can be determined based on latency and/or capacity constraints of a subsequent component that is to continue processing and/or processing of other ranking signals (as described above). However, in another example, ranker 426 may output a single alternative (e.g., a top choice alternative) determined based on ranking applied.

The meta-action update component 428 that evaluates a user interaction with system 400 to improve processing in returning the most accurate response to received input. The meta-action update component 428 evaluates a belief of the system 400 that is affected by how a user responds to a system output. As examples, the meta-action update component 428 evaluates cases such as the user disambiguating from amongst a set of items presented by the system 400 or the user resetting the state of the interaction or conversation altogether (possibly in response to an incorrect system understanding output from a previous turn), among other examples. Like the slot and entity component 424, the meta-action update component 428 associates with the belief state data 448. For example, an output from the system 400 from a previous turn may be a list of options to choose from where the user may make a selection of an item from the list of options. This information may be retained as belief state data 448 to assist the system 400 in providing the best possible hypothesis to a received input. Further, the meta-action update component 428 can be configured such that it produces multiple ranked outputs for different levels of confidence with respect to potential alternatives for determining an output of system 400. The meta-action update component 428 may update alternatives and continue to expand a set of alternatives for consideration by the system 400 as final hypotheses. Like other components of system 400, the meta-action update component 428 may retain as well as propagate alternative interpretations instead of settling on a single choice for output. Alternatives generated and/or expanded on by the meta-action update component 428 may be propagated to ranker 430.

One or more ranker 430 components that can be used to evaluate the alternatives propagated from the meta-action update component 428. In one example, generated alternatives may be ranked based on a determined likelihood of the system 400 based on a belief stemming from user interaction with system 400. However, a component may analyze and evaluate response options in any manner that enables the component to distinguish response options/alternatives from one another. In examples, a confidence value may be associated with each of the generated alternatives. A confidence value may be assessed to each of the potential alternatives, where the confidence value indicates how confident the meta-action update component 428 is with respect to developing hypotheses/alternatives for a received input. Comparison of alternatives may include statistical modeling and/or ranking of alternatives whereby metrics may be applied to rank the generated alternatives. Ranker 430 may be used to prune a listing of outgoing alternatives that are propagated for subsequent processing. For instance, the ranker 430 may interface with the knowledge components 432 of system 400 to intelligently propagate a number of ranked alternatives for additional processing. In doing so, system 400 can make sure components of system 400 are processing effectively and efficiently. As an example, the number of ranked alternatives propagated from the ranker 430 may be determined using a threshold evaluation. The threshold used to determine the number of ranked alternatives to propagate for subsequent processing can be determined based on latency and/or capacity constraints of a subsequent component that is to continue processing and/or processing of other ranking signals (as described above). However, in another example, ranker 430 may output a single alternative (e.g., a top choice alternative) determined based on ranking applied.

In examples, propagated alternatives from any of the components of system 400 may be transmitted to the knowledge components 432 for additional processing. In one example where a first input is received, input understanding components 408 may propagate an expanded set of alternatives to the knowledge components 432. In another example where multiple inputs are received, the belief state components 422 may transmit alternatives to the knowledge components 432. The knowledge components 432 apply knowledge data from external resources to propagated alternatives. External resources are any resource (e.g., system, application/service, etc.) that exists and is manageable outside of system 400. External resources include but are not limited to systems, application/services that may be managed by a same organization as system 400 (e.g., other services provided by an organization such as web search services, e-mail applications, calendars, device management services, address book services, informational services, etc.) as well as services and/or websites that are hosted or controlled by third parties. For example, external resources may include line-of-business (LOB) management services, customer relationship management (CRM) services, debugging services, accounting services, payroll services, etc. External resources may further include other websites and/or applications hosted by third parties, such as social media websites; photo sharing websites; video and music streaming websites; search engine websites; sports, news or entertainment websites, and the like. External resources may provide robust reporting, analytics, data compilation and/or storage service, etc., whereas other external resources may provide search engines or other access to data and information, images, videos, and the like.

The knowledge components 432 comprise components such as a knowledge fetch component 434 and knowledge stores, for example as shown by knowledge store A 436 and knowledge store B 438. The knowledge fetch component 434 is a component that is used to evaluate and validate slot or entity information associated with a propagated alternative. For all available alternatives, a knowledge fetch operation is executed (e.g., a dictionary lookup, database hit, access to personalized information such as address book, library data, etc.) to resolve and/or validate slot data or entities associated with an alternative. Knowledge stores 436 and 438 are frameworks representing knowledge data or information used by components of the system 400 to improve processing. In one example, a knowledge store may be a hardware component that has the ability to store data and process data to manage requests for knowledge data. In another example, a knowledge store may be run as a software component executable on a processing device or across multiple processing devices, possibly even in communication with external or third-party services that contain any additional knowledge that can be of use. As previously described, knowledge data may be any data usable by components to improve processing. Knowledge data increases the amount of information that system 400 has access to so that system 400 may make more informed decisions at a given point in time. Types of information that a knowledge store such as knowledge stores 436 and 438 may maintain include but are not limited to information on:

definitions, policy rules, name data, historical data (including data from previous queries), interrelationships between components of the system 400, restrictions (e.g. formal stated descriptions of truth for evaluating data), classes (e.g., collections, concepts, programming types), attribute data (e.g., properties, features, characteristics, parameters), axioms, access to external resources including third-party resources, events and functional terms, among other examples. The knowledge stores such as knowledge stores 436 and 438 may also communicate with components or resources outside of the system 400 to gather or collect information relevant to performing processing and making a best possible decision as to how the system 400 may respond to a user input. As an example, a knowledge store may be linked to network resources or third-party services over the Internet, for example search engines (e.g., Bing, Google Search, Yahoo Search, Ask, WebCrawler, Dogpile, etc.) as well as any other knowledge repositories (e.g., Wikipedia, Freebase, IMDB, Amazon, etc). In examples, the knowledge fetch component 434 may interface with a plurality of knowledge stores to provide system 400 with as much information as possible to best evaluate alternatives as potential response options to a received input. Data associated with alternatives may be filled in/completed, where a completed alternative is propagated to the policy determination components 440 for final evaluation and binding to an alternative as a hypothesis to a received input.

The policy determination components may comprise a response generation component 442, a final ranker 444, a final response 446 for output and belief state data 448. The final response generation component 442 is used to compile and evaluate all propagated alternatives with respect to the knowledge data applied by the knowledge fetch component 434. Given all the information available, the final response generation component 442 generates the best possible system response for each alternative. From that point, the response generation component 442 propagates hypotheses to the final ranker 444 component to rank response options as potential hypotheses for system output.

One or more final ranker 444 components that can be used to rank potential hypotheses. The final ranker 444 may analyze and evaluate potential hypotheses in any manner that enables the component to distinguish potential hypotheses from one another. In examples, a confidence value may be associated with each of the potential hypotheses. A confidence value may be assessed to each of the potential alternatives. Comparison of potential hypotheses may include statistical modeling and/or ranking of alternatives whereby metrics may be applied to rank the generated alternatives. Final ranker 444 may be used to prune a listing of potential hypotheses. A threshold used to determine the number of response options to output. As an example, the final ranker 444 may utilize ranking signals (as described above) in determining a response option. As an example, final ranker 444 may output a single hypothesis as a response option (e.g., a top choice) determined based on ranking applied. In other example, the output may comprise more than one hypotheses as response options.

Based on the ranking applied by the final ranker 444, a final response 446 is output from system 400. In examples, a final response 446 may be one or more outputs. As an example, a final response 446 may be an action that is initiated based on a received input. For instance, in the example where an input is directed towards scheduling a meeting with "Omar", a final response 446 may comprise launching of a domain/application and taking action with that domain in accordance with the received input. In some examples, a final response 446 that is output may be a clarification for further information. For example, the response generation component 442 may determine that certain data is missing that prevents the system 400 for satisfying a user request. In other examples, the system 400 may have a low confidence level with respect to what the user intended regarding a received input. In evaluating system 400 as a whole, uncertainty may exist at any point in processing of a received input. By delaying binding to a response option until it is received at an upstream component of system 400, downstream components of system 400 are provided a better global view of the overall user input. Such a configuration minimizes the possibility of an unrecoverable error occurring during processing of a received input.

As identified previously, policy determination components 440 comprise retaining belief state data 448. The availability of all such alternatives at final steps of processing of a turn allows retaining the belief state data 448 in the form of an enriched belief state which can then be consulted in a subsequent turn to improve processing. In examples, belief state data 448 may be retained at any point in processing by system 400. As an example, belief state data 448 is retained based on final response generation and ranking (e.g., by the final ranker 444). For instance, selected and non-selected response options may be retained as belief state data 448. In examples, if system 400 chooses an incorrect alternative/hypothesis, the system 400 may consult this belief state data 448 to understand the alternate choices that were available in the previous turn and coupled with information in a current turn, the system 400 can better identify a correct choice and quickly recover during interaction with a user.

Figure 5:
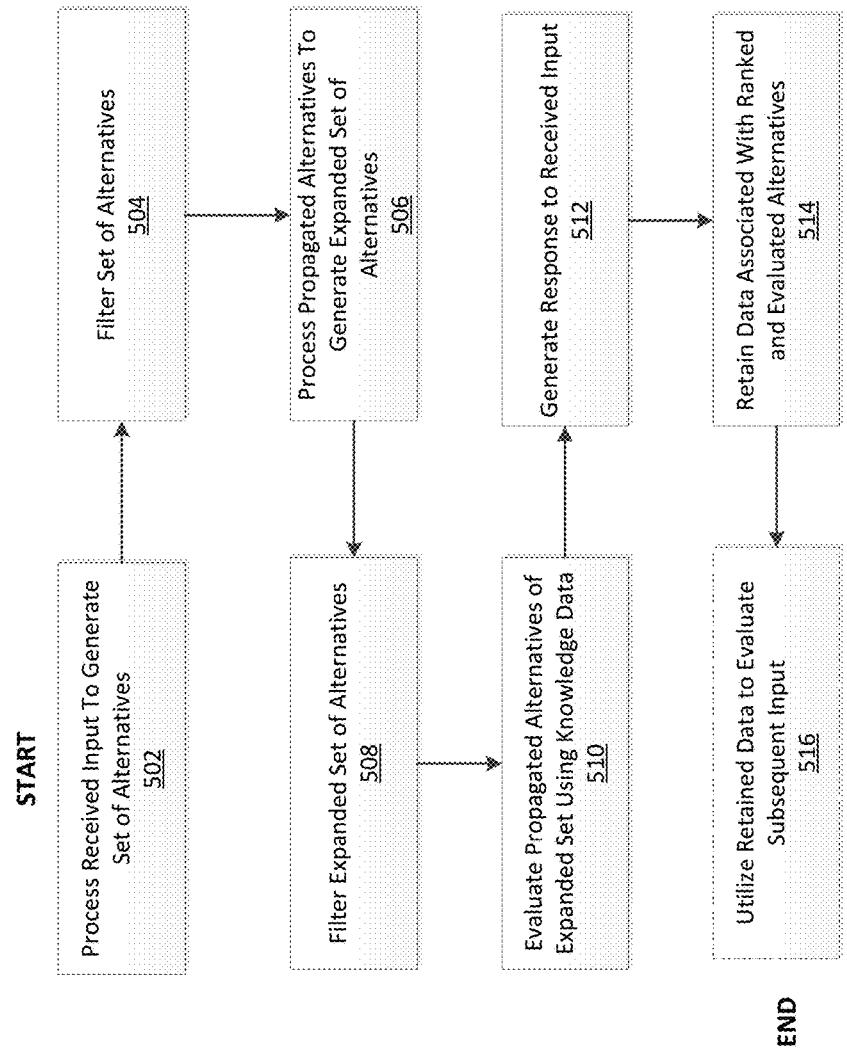
FIG. 5 is an exemplary method for input understanding processing with which aspects of the present disclosure may be practiced.

FIG. 5 is an exemplary method 500 for input understanding processing with which aspects of the present disclosure may be practiced. As an example, method 500 may be executed by an exemplary system such as shown in FIGS. 1-4. In examples, method 500 may be executed on a device comprising at least one processor configured to store and execute operations, programs or instructions. However, method 500 is not limited to such examples. In at least one example, method 500 may be executed (e.g., computer-implemented operations) by one or more components of a distributed network, for instance, web service/distributed network service (e.g. cloud service). In examples, operations performed in method 500 may correspond to operations executed by a system and/or service that execute computer programs, application programming interfaces (APIs), or machine-learning processing, among other examples.

Method 500 begins at operation 502, where received input is processed. At operation 502, the received input is processed to generate a set of alternatives that can lead to multiple potential hypotheses (e.g., potential response options) to the received input. A set of alternatives may comprise a plurality of alternatives generated from evaluation of a received input. As an example, the processing executed in operation 502 may be performed by an input recognition component such as the recognition component 404 described in exemplary system 400. In one example, an automatic speech recognition component is used to perform operation 502 by evaluating a received utterance.

Flow may proceed to operation 504, where the generated set of alternatives may be filtered. Operation 504 may comprise ranking alternatives of the set of alternatives and propagating a plurality of the ranked alternatives for additional processing. As an example, the processing executed in operation 504 may be performed by an input recognition components 402 such as the ranker 406 described in exemplary system 400. In one example, an automatic speech recognition component is used to perform operation 504 by evaluating a received utterance. As an example, a number of the ranked alternatives to be propagated for additional processing is determined using a threshold that is set based on at least one of a latency of an input processing component and a capacity of the input processing component, being an input processing component that is to receive the propagated alternatives.

Flow may proceed to operation 506, where propagated alternatives are processed. Operation 506 may comprise evaluating the propagated alternatives to generate an expanded set of alternatives as potential hypotheses. An expanded set of alternatives may comprise alternatives previously propagated as well as additional alternatives generated from further evaluation of the propagated alternatives. As an example, the processing executed in operation 506 may be performed by input understanding components 408 as described in exemplary system 400. In one example, a language understanding component is used to perform operation 506.

Flow may proceed to operation 508, where the expanded set of alternatives is filtered. Operation 508 may comprise ranking alternatives of the expanded set of alternatives and propagating a plurality of the ranked alternatives of the expanded set for additional processing. As an example, the processing executed in operation 508 may be performed by an input recognition components 402 such as the rankers 412, 416 and 420 described in exemplary system 400. In one example, a language understanding component is used to execute operation 508. As an example, a number of the ranked alternatives of the expanded set that are to be propagated for additional processing is determined using a threshold that is set based on at least one of a latency of an input processing component and a capacity of the input processing component, being an input processing component that is to receive the propagated alternatives of the expanded set.

At operation 510, the propagated alternatives of the expanded set are evaluated using knowledge data. Knowledge data is described in the description of system 400 of FIG. 4. As an example, knowledge data is fetched from external resources. External resources are described in the description of system 400 of FIG. 4. In operation 510, the knowledge data fetched from the external resources is applied to the propagated alternatives of the expanded set. In examples, operation 510 may be executed by a knowledge fetch component 434 as described in system 400 of FIG. 4.

Flow may proceed to operation 512 where a response to the received input is generated. Examples of operation 512 may comprise ranking the evaluated alternatives that include applied knowledge data and selecting a response from the ranked and evaluated alternatives. In examples, operation 512 may be executed by policy determination components 440 as described in system 400 of FIG. 4. For example, potential hypotheses may be generated by a component such as the response generation component 442. Potential hypotheses may be ranked by a component such as the final ranker 444, and a final response 446 may be output from a system/service.

Flow may proceed to operation 514 where data associated with the ranked and evaluated alternatives is retained. As an example, retained data may correspond with belief state data 448 as described in system 400 of FIG. 4. Belief state data may be used to improve processing by a system/service during a continued interaction with a user.

Examples of method 500 may comprise operation 516, where the data retained may be utilized to evaluate a subsequent received input. Description of processing related to evaluating a subsequently received input is described in method 600 of FIG. 6.

FIG. 6 is an exemplary method 600 for input understanding processing with which aspects of the present disclosure may be practiced. As an example, method 600 may be executed by an exemplary system such as shown in FIGS. 1-4. In examples, method 600 may be executed on a device comprising at least one processor configured to store and execute operations, programs or instructions. However, method 600 is not limited to such examples. In at least one example, method 600 may be executed (e.g., computer-implemented operations) by one or more components of a distributed network, for instance, web service/distributed network service (e.g. cloud service). In examples, operations performed in method 600 may correspond to operations executed by a system and/or service that execute computer programs, application programming interfaces (APIs), or machine-learning processing, among other examples.

Method 600 begins at operation 602, where a subsequent received input is processed. At operation 602, the subsequent received input is processed to generate a set of subsequent alternatives as potential hypotheses to the subsequent received input. A set of subsequent alternatives may comprise a plurality of alternatives generated from evaluation of a received input. In examples, the set of subsequent alternatives may be generated based on retained belief state data (e.g., belief state data 448 described in FIG. 4) to improve processing. As an example, the processing executed in operation 602 may be performed by an input recognition component such as the recognition component 404 described in exemplary system 400. In one example, an automatic speech recognition component is used to perform operation 602 by evaluating a received utterance.

Flow may proceed to operation 604, where the generated set of subsequent alternatives may be filtered. Operation 604 may comprise ranking alternatives of the set of subsequent alternatives and propagating a plurality of the ranked subsequent alternatives for additional processing. As an example, the processing executed in operation 604 may be performed by an input recognition components 402 such as the ranker 406 described in exemplary system 400. In one example, an automatic speech recognition component is used to perform operation 604 by evaluating a received utterance. As an example, a number of the ranked subsequent alternatives to be propagated for additional processing is determined using a threshold that is set based on at least one of a latency of an input processing component and a capacity of the input processing component, being an input processing component that is to receive the propagated subsequent alternatives.

Flow may proceed to operation 606, where propagated subsequent alternatives are processed. Operation 606 may comprise evaluating the propagated subsequent alternatives to generate an expanded set of subsequent alternatives as potential hypotheses. An expanded set of alternatives may comprise alternatives previously propagated as well as additional alternatives generated from further evaluation of the propagated alternatives. In examples, the processing of the set of subsequent alternatives may be enhanced using retained belief state data (e.g., belief state data 448 described in FIG. 4). As an example, the processing executed in operation 606 may be performed by input understanding components 408 as described in exemplary system 400. In one example, a language understanding component is used to perform operation 606.

Flow may proceed to operation 608, where the expanded set of subsequent alternatives is filtered. Operation 608 may comprise ranking subsequent alternatives of the expanded set and propagating a plurality of the ranked subsequent alternatives of the expanded set for additional processing. As an example, the processing executed in operation 608 may be performed by an input recognition components 402 such as the rankers 412, 416 and 420 described in exemplary system 400. In one example, a language understanding component is used to execute operation 608. As an example, a number of the ranked alternatives of the expanded set that are to be propagated for additional processing is determined using a threshold that is set based on at least one of a latency of an input processing component and a capacity of the input processing component, being an input processing component that is to receive the propagated alternatives of the expanded set.

At operation 610, propagated subsequent alternatives may be evaluated to determine relevance of a slot or entity from a previous received input. Operation 610 may comprise updating the expanded set of subsequent alternatives based on a determination made as to whether a slot or entity from a previous input is still relevant. Flow may proceed to operation 612 where the propagated subsequent alternatives are filtered based on the evaluating of the slot/entity relevance. In examples, operation 612 may further comprise ranking subsequent alternatives based on the determination made as to whether a slot or entity from a previous input is still relevant. Operation 612 may further comprise propagating a plurality of subsequent alternatives for additional processing.

Flow may proceed to operation 614, where the propagated subsequent alternatives are evaluated based on user response during interaction with an input understanding system and/or service. Operation 614 may comprise updating the expanded set of subsequent alternatives based on evaluating how responses of a user during interaction (e.g., conversation) may impact alternative generation. Flow may proceed to operation 616 where the propagated subsequent alternatives are filtered based on the evaluating of user interaction. In examples, operation 616 may further comprise ranking subsequent alternatives. Operation 616 may further comprise propagating a plurality of subsequent alternatives for additional processing.

At operation 618, the propagated subsequent alternatives of the expanded set are evaluated using knowledge data. Knowledge data is described in the description of system 400 of FIG. 4. As an example, knowledge data is fetched from external resources. External resources are described in the description of system 400 of FIG. 4. In operation 618, the knowledge data fetched from the external resources is applied to the propagated subsequent alternatives of the expanded set. In examples, operation 618 may be executed by a knowledge fetch component 434 as described in system 400 of FIG. 4.

Flow may proceed to operation 620 where a response to the received subsequent input is generated. Examples of operation 620 may comprise ranking the evaluated alternatives that include applied knowledge data and selecting a hypothesis from the ranked and evaluated alternatives. In examples, operation 620 may be executed by policy determination components 440 as described in system 400 of FIG. 4. For example, one or more final response options may be generated by a component such as the response generation component 442. Final response options may be ranked by a component such as the final ranker 444, and a final response 446 may be output from a system/service.

FIG. 7 is an exemplary method 700 for conversational understanding processing with which aspects of the present disclosure may be practiced. As an example, method 700 may be executed by an exemplary system such as shown in FIGS. 1-4. In examples, method 700 may be executed on a device comprising at least one processor configured to store and execute operations, programs or instructions. However, method 700 is not limited to such examples. In at least one example, method 700 may be executed (e.g., computer-implemented operations) by one or more components of a distributed network, for instance, web service/distributed network service (e.g. cloud service). In examples, operations performed in method 700 may correspond to operations executed by a system and/or service that execute computer programs, application programming interfaces (APIs), or machine-learning processing, among other examples.

Flow begins at decision operation 702, where it is determined whether an utterance is received for processing by a conversation understanding system and/or service. If no utterance is received, flow branches NO and processing of method 700 ends. However, if it is determined that an utterance is received, flow branched YES and proceeds to operation 704.

In operation 704, the utterance is processed through a conversational understanding stack. A conversational understanding (CU) stack in a collection of processing components that may be used to receive an utterance, process the utterance, and determine a response option/action for the received spoken utterance. A CU stack may comprise one or more components as described in system 400 of FIG. 4. Further, processing operations performed by a CU stack may comprise one or more operations from methods 500 and 600, described previously. Processing (operation 704) of the received utterance may comprise generating and outputting a response (e.g., hypothesis) to the received utterance.

Flow may then proceed to decision operation 706 where it is determined whether a subsequent utterance is received. If no subsequent utterance is received, flow branches NO and processing of method 700 ends. However, if it is determined that an utterance is received, flow branched YES and proceeds to operation 708.

In operation 708, the subsequent utterance is processed through the conversational understanding stack. Processing (operation 708) of the received utterance may comprise generating and outputting a response to the received utterance. In examples, operation 708 may utilize belief state data 448 described in FIG. 4, to enrich processing of the subsequent utterance. Flow of method 700 may then return to decision operation 706, where it is determined whether another utterance is received.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
processing, by a speech recognition system, a received input to generate a set of alternatives, wherein the set of alternatives corresponds to hypothetical interpretations of the received input, and wherein the received input is an utterance;
filtering the set of alternatives, wherein the filtering comprises ranking the set of alternatives using machine learning techniques and propagating a plurality of the ranked alternatives for additional processing, wherein the machine learning techniques include comparing confidence metrics for two or more alternatives in the set of alternatives;
processing the propagated alternatives to generate an expanded set of alternatives as potential hypotheses based on the received input, wherein generating the expanded set of alternatives comprises determining one or more domains associated with the input, and generating one or more alternatives associated with the one or more domains;
filtering the expanded set of alternatives, wherein the filtering comprises ranking alternatives of the expanded set and propagating a plurality of the ranked alternatives of the expanded set for additional processing;
evaluating the propagated alternatives of the expanded set based on application of knowledge data fetched from external resources;
generating a response to the received input, wherein the generating comprises ranking the evaluated alternatives and selecting a ranked and evaluated alternative for generating the response; and
providing the response to a user.

2. The computer-implemented method according to claim 1, further comprising retaining data associated with ranked and evaluated alternatives.

3. The computer-implemented method according to claim 2, further comprising utilizing the retained data to evaluate a received subsequent input.

4. The computer-implemented method according to claim 2, further comprising:
processing a received subsequent input to generate a set of subsequent input alternatives for recognition of the received subsequent input;
filtering the set of subsequent input alternatives, wherein the filtering comprises ranking the set of subsequent input alternatives and propagating a plurality of the ranked subsequent input alternatives for additional processing;
processing the propagated subsequent alternatives to generate an expanded set of subsequent input alternatives as potential hypotheses to the received subsequent input;
filtering the expanded set of subsequent input alternatives, wherein the filtering comprises ranking the expanded set and propagating a plurality of the ranked subsequent input alternatives of the expanded set for additional processing; and
processing the propagated subsequent input alternatives of the expanded set including evaluating whether a slot or entity associated with a previous received input is relevant to the received subsequent input and evaluating the propagated subsequent input alternatives based on user response during interaction with an input understanding service.

5. The computer-implemented method according to claim 4, wherein the processing of the propagated subsequent input alternatives comprises generating ranked output alternatives and propagating a plurality of the ranked output alternatives for additional processing.

6. The computer-implemented method according to claim 5, further comprising evaluating the propagated plurality of ranked output alternatives based on application of the knowledge data fetched from the external resources, and generating a response to the received subsequent input, wherein the generating ranks the evaluated output alternatives and selects the response for output from the ranked and evaluated output alternatives.

7. The computer-implemented method according to claim 1, wherein the plurality of propagated and ranked alternatives from the set of alternatives is determined using a threshold that is set based on at least one selected from a group consisting of: a latency of an input processing component, a capacity of the input processing component, and processing of a set of ranking signals.

8. The computer-implemented method according to claim 5, wherein the plurality of the ranked output alternatives is determined using a threshold that is set based on at least one selected from a group consisting of: a latency of an input processing component and a capacity of the input processing component, and processing of a set of ranking signals.

9. An input understanding system comprising:
at least one processor; and
a memory operatively connected with the at least one processor, the memory comprising computer executable instructions that, when executed by the at least one processor, perform a method comprising:
processing, using an input recognition component of a speech recognition system, a received input to generate a set of alternatives, wherein the set of alternatives corresponds to hypothetical interpretations of the received input, and wherein the received input is an utterance;
filtering the set of alternatives, wherein the filtering comprises ranking the set of alternatives using machine learning techniques and propagating a plurality of the ranked alternatives from the set to an input understanding component, wherein the machine learning techniques include comparing confidence metrics for two or more alternatives in the set of alternatives;
processing, using the input understanding component, the propagated alternatives to generate an expanded set of alternatives as potential hypotheses based on the received input, wherein generating the expanded set of alternatives comprises determining one or more domains associated with the input, and generating one or more alternatives associated with the one or more domains;
filtering the expanded set of alternatives, wherein the filtering comprises ranking alternatives of the expanded set and propagating a plurality of the ranked alternatives of the expanded set to a knowledge fetch component;

evaluating, using the knowledge fetch component, the propagated alternatives of the expanded set based on application of knowledge data fetched from external resources and propagating the evaluated alternatives to a policy determination component;

generating, using the policy determination component, a response to the received input, wherein the policy determination component ranks the evaluated alternatives and selects the response from the ranked and evaluated alternatives; and providing the response to a user.

10. The input understanding system according to claim 9, wherein the executed operations further comprising retaining data associated with ranked and evaluated alternatives.

11. The input understanding system according to claim 10, wherein the executed operations further comprising utilizing the retained data to evaluate a received subsequent input.

12. The input understanding system according to claim 10, wherein the executed operations further comprising:
processing, using the input recognition component, a received subsequent input to generate a set of subsequent input alternatives for recognition of the received subsequent input,
filtering the set of subsequent input alternatives, wherein the filtering comprises ranking the set of subsequent input alternatives and propagating a plurality of the ranked subsequent input alternatives to the input understanding component,
processing, using the input understanding component, the propagated subsequent alternatives to generate an expanded set of subsequent input alternatives as the potential hypotheses,
filtering the expanded set of subsequent input alternatives, wherein the filtering comprises ranking the expanded set and propagating a plurality of the ranked subsequent input alternatives of the expanded set to a belief state component, and
processing, using the belief state component, the propagated subsequent input alternatives of the expanded set including evaluating whether a slot or entity associated with a previous received input is relevant to the received subsequent input and evaluating the propagated subsequent input alternatives based on user response during interaction with the input understanding system.

13. The input understanding system according to claim 12, wherein the belief state component processing comprises generating ranked output alternatives and propagating a plurality of the ranked output alternatives to the knowledge fetch component.

14. The input understanding system according to claim 13, wherein the executed operations further comprising evaluating, by the knowledge fetch component, the propagated plurality of ranked output alternatives based on application of the knowledge data fetched from the external resources and propagating the evaluated alternatives to the policy determination component, and
using the policy determination component, generating a response to the received subsequent input, wherein the policy determination component ranks the evaluated output alternatives received from the knowledge fetch component and selects the response for output from the ranked and evaluated output alternatives.

15. The input understanding system according to claim 9, wherein the input understanding system is conversational understanding system, the input recognition component is an automatic speech component, and the input understanding component is a language understanding component.

16. The input understanding system according to claim 9, wherein the plurality of propagated and ranked alternatives from the set of alternatives is determined using a threshold that is set based on at least one selected from a group consisting of: a latency of the input understanding component and a capacity of the input understanding component, and processing of a set of ranking signals.

17. A computer-readable storage device including executable instructions, that when executed on at least one processor, causing the processor to perform operations comprising:
using an automatic speech recognition component of a speech recognition system, processing a received utterance to generate a set of alternatives, wherein the set of alternatives corresponds to hypothetical interpretations of the received input;
filtering the set of alternatives by ranking the set of alternatives using machine learning techniques and propagating a plurality of the ranked alternatives to a language understanding component, wherein the machine learning techniques include comparing confidence metrics for two or more alternatives in the set of alternatives;
using the language understanding component, processing the propagated alternatives to generate an expanded set of alternatives as potential hypotheses based on the received utterance, wherein generating the expanded set of alternatives comprises determining one or more domains associated with the input, and generating one or more alternatives associated with the one or more domains;
filtering the expanded set of alternatives by ranking alternatives of the expanded set and propagating a plurality of the ranked alternatives of the expanded set to a knowledge fetch component;
using the knowledge fetch component, evaluating the propagated alternatives of the expanded set based on application of knowledge data fetched from external resources and propagating the evaluated alternatives to a policy determination component;
using the policy determination component, generating a response to the received utterance, wherein the policy determination component ranks the evaluated alternatives and outputs the response from the ranked and evaluated alternatives; and
providing the response to a user.

18. The computer-readable storage device according to claim 17, where the operations further comprising:
using the automatic speech recognition component, processing a received subsequent input to generate a set of subsequent input alternatives for recognition of the received subsequent input and filtering the set of subsequent input alternatives, wherein the filtering comprises ranking the set of subsequent input alternatives and propagating a plurality of the ranked subsequent input alternatives for additional processing;
using the language understanding component, processing the propagated subsequent alternatives to generate an expanded set of subsequent input alternatives as the potential hypotheses and filtering the expanded set of subsequent input alternatives, wherein the filtering comprises ranking the expanded set and propagating a plurality of the ranked subsequent input alternatives of the expanded set for additional processing;

using a belief state component, processing the propagated subsequent input alternatives of the expanded set including evaluating whether a slot or entity associated with a previous received utterance is relevant to the received subsequent input and evaluating the propagated subsequent input alternatives based on user response during interaction with an input understanding service, wherein processing of the propagated subsequent input alternatives comprises generating ranked output alternatives and propagating a number of the ranked output alternatives for additional processing;

using the knowledge fetch component, evaluating the propagated number of ranked output alternatives based on application of the knowledge data fetched from the external resources; and using the policy determination component, generating a response to the received subsequent input, wherein the policy determination component ranks the evaluated output alternatives and outputs the response from the ranked and evaluated output alternatives.

19. The computer-implemented method according to claim 1, wherein one or more alternatives in the plurality of the ranked alternatives are ranked based on a determined likelihood that an identified domain associated with the one or more alternatives satisfies an intention of the received utterance.

20. The computer-implemented method according to claim 1, wherein ranking the set of alternatives comprises determining a confidence value for one or more alternatives in the set of alternatives and comparing two or more of the determined confidence values to determine a ranking order.

21. The computer-implemented method according to claim 1, wherein processing the received input comprises at least one of producing an NBest list of alternatives and producing a word confusion network.

22. The input understanding system according to claim 9, wherein the input understanding component generates a triplet comprising one or more domains, one or more intents and one or more tagged slots, and wherein the triplet is used to determine the one or more alternatives.

* * * * *